(12) United States Patent
Reuter

(10) Patent No.: US 8,893,466 B2
(45) Date of Patent: Nov. 25, 2014

(54) DUAL PUMP FUEL FLOW SYSTEM FOR A GAS TURBINE ENGINE AND METHOD OF CONTROLLING

(75) Inventor: Charles E. Reuter, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 865 days.

(21) Appl. No.: 13/051,091

(22) Filed: Mar. 18, 2011

(65) Prior Publication Data

US 2012/0234015 A1 Sep. 20, 2012

(51) Int. Cl.
| F02C 9/26 | (2006.01) |
| F02C 9/30 | (2006.01) |
| F02C 9/38 | (2006.01) |
| F02C 7/224 | (2006.01) |
| F02C 7/236 | (2006.01) |

(52) U.S. Cl.
CPC ............... *F02C 9/263* (2013.01); *F02C 7/236* (2013.01)
USPC .............................. 60/39.281; 60/734; 60/736

(58) Field of Classification Search
CPC ............ F02C 7/236; F02C 7/22; F02C 9/263; F02C 9/36; F02C 9/38
USPC .................... 60/39.281, 734, 736, 739
See application file for complete search history.

(56) References Cited

U.S. PATENT DOCUMENTS

| 2,944,597 A * | 7/1960 | Wilson ........................ 137/563 |
| 3,696,612 A | 10/1972 | Berman |
| 3,899,877 A | 8/1975 | Flanigan et al. |
| 4,151,710 A | 5/1979 | Griffin et al. |
| 4,354,345 A | 10/1982 | Dreisbach, Jr. et al. |
| 4,498,525 A | 2/1985 | Smith |
| 4,618,037 A | 10/1986 | Nishikawa et al. |
| 4,741,152 A | 5/1988 | Burr et al. |
| 4,809,499 A | 3/1989 | Dyer |
| 4,876,880 A | 10/1989 | Dyer |
| 4,899,535 A | 2/1990 | Dehan et al. |
| 4,910,956 A | 3/1990 | Legore et al. |
| 5,118,258 A | 6/1992 | Martin |
| 5,156,332 A | 10/1992 | Dyer |
| 5,159,808 A | 11/1992 | Kast |
| 5,241,814 A * | 9/1993 | Butler .......................... 60/39.08 |
| 5,313,790 A | 5/1994 | Barr |
| 5,337,553 A | 8/1994 | Barr |

(Continued)

FOREIGN PATENT DOCUMENTS

| EP | 1 329 617 A2 | 7/2003 |
| EP | 1 557 546 A1 | 7/2005 |

(Continued)

OTHER PUBLICATIONS

Extended European Search Report from EP Application Serial No. 12160237.9, dated Mar. 20, 2013, 6 pages.

*Primary Examiner* — Andrew Nguyen
(74) *Attorney, Agent, or Firm* — Kinney & Lange, P.A.

(57) ABSTRACT

A fuel flow system for a gas turbine includes a first pump, a main fuel flow path and a second pump. The first pump is connected to an actuator and a metering valve. The main fuel flow path is formed between the first pump and the metering valve. The second pump is connected to the main fuel flow path and supplements the fuel flow from the first pump under certain conditions. The second pump and first pump are in parallel.

9 Claims, 3 Drawing Sheets

(56) References Cited

U.S. PATENT DOCUMENTS

| | | |
|---|---|---|
| 5,339,636 A | 8/1994 | Donnelly et al. |
| 5,442,922 A | 8/1995 | Dyer et al. |
| 5,448,882 A | 9/1995 | Dyer et al. |
| 5,456,574 A | 10/1995 | Donnelly et al. |
| 5,495,715 A | 3/1996 | Loxley |
| 5,702,229 A | 12/1997 | Moss et al. |
| 5,715,674 A | 2/1998 | Reuter et al. |
| 5,896,737 A | 4/1999 | Dyer |
| 6,022,197 A | 2/2000 | Cygnor et al. |
| 6,059,537 A | 5/2000 | Cygnor |
| 6,189,313 B1 | 2/2001 | Cass et al. |
| 6,250,894 B1 | 6/2001 | Dyer et al. |
| 6,251,270 B1 | 6/2001 | Blot-Carretero et al. |
| 6,321,527 B1 | 11/2001 | Dyer et al. |
| 6,446,437 B1 | 9/2002 | Smith |
| 6,487,847 B1 | 12/2002 | Snow et al. |
| 6,651,441 B2 | 11/2003 | Reuter et al. |
| 7,401,461 B2 | 7/2008 | Eick et al. |
| 8,596,993 B2 * | 12/2013 | Kleckler ........................ 417/288 |

FOREIGN PATENT DOCUMENTS

| | | |
|---|---|---|
| WO | WO 03/023208 A1 | 3/2003 |
| WO | WO 2007/044020 A2 | 4/2007 |
| WO | WO 2011/042641 A1 | 4/2011 |

\* cited by examiner

DUAL PUMP FUEL FLOW SYSTEM FOR A GAS TURBINE ENGINE AND METHOD OF CONTROLLING

CROSS-REFERENCE TO RELATED APPLICATION(S)

Reference is made to application Ser. No. 13/051,108 (which issued as U.S. Pat. No. 8,408,233) entitled "Flow Control System and Method for Controlling Two Positive Displacement Pumps," which is filed on even date and is assigned to the same assignee as this application.

BACKGROUND

In a gas turbine engine, oil is distributed to various components, such as bearings, for cooling and lubrication. The oil is heated as it circulates around or through these various components. The oil can be cooled by cooling air or fuel flowing to the combustion chamber. Cooling air is typically taken from the fan, which is expensive and reduces thrust of the engine. Fuel flowing to the combustion chamber can also be used to cool the hot circulating oil. Rejecting heat from the oil into the fuel incurs few of the penalties of air cooling. However, the amount of rejected heat is limited by the maximum temperature tolerable by the fuel.

The fuel system of a gas turbine engine includes a fuel pump for pressurizing and transporting the fuel through the system to the combustion chamber. The fuel pump is generally a boost stage and single positive displacement main stage which is attached to the gearbox such that the speed of the main fuel pump is proportional to the engine speed. At certain conditions, such as cruise, the engine operates at a relatively high speed while a relatively low fuel flow is required. Further, the main fuel pump stage is typically sized by high power or start conditions, resulting in extra flow capacity at all other engine operation conditions. In this way, the main fuel pump stage results in excess fuel flow. The excess fuel is recycled through a bypass loop to the low pressure side of the main pump. At low fuel requirements, the fuel may be recycled several times before being sent to the combustion chamber. The combination of recycling excess fuel and pump inefficiencies increases the temperature of the fuel. This additional heat limits the amount of heat that can be rejected into the fuel from the circulating oil. Reducing the amount of heat rejected into the fuel by the fuel pump would improve engine performance. Further, a large amount of time spent is in the cruise condition during a flight, and reducing the amount of heat rejected into the fuel by the main pump during the cruise condition may have a larger impact on engine performance than similar reductions during other flight conditions.

SUMMARY

A fuel flow system for a gas turbine includes a first pump, a main fuel flow path and a second pump. The first pump is connected to an actuator. The main fuel flow path is formed between the first pump and the actuator. The second pump is connected to the main fuel flow path and supplements the fuel flow from the first pump under certain conditions. The second pump and first pump are in parallel.

DETAILED DESCRIPTION

Figure 1:
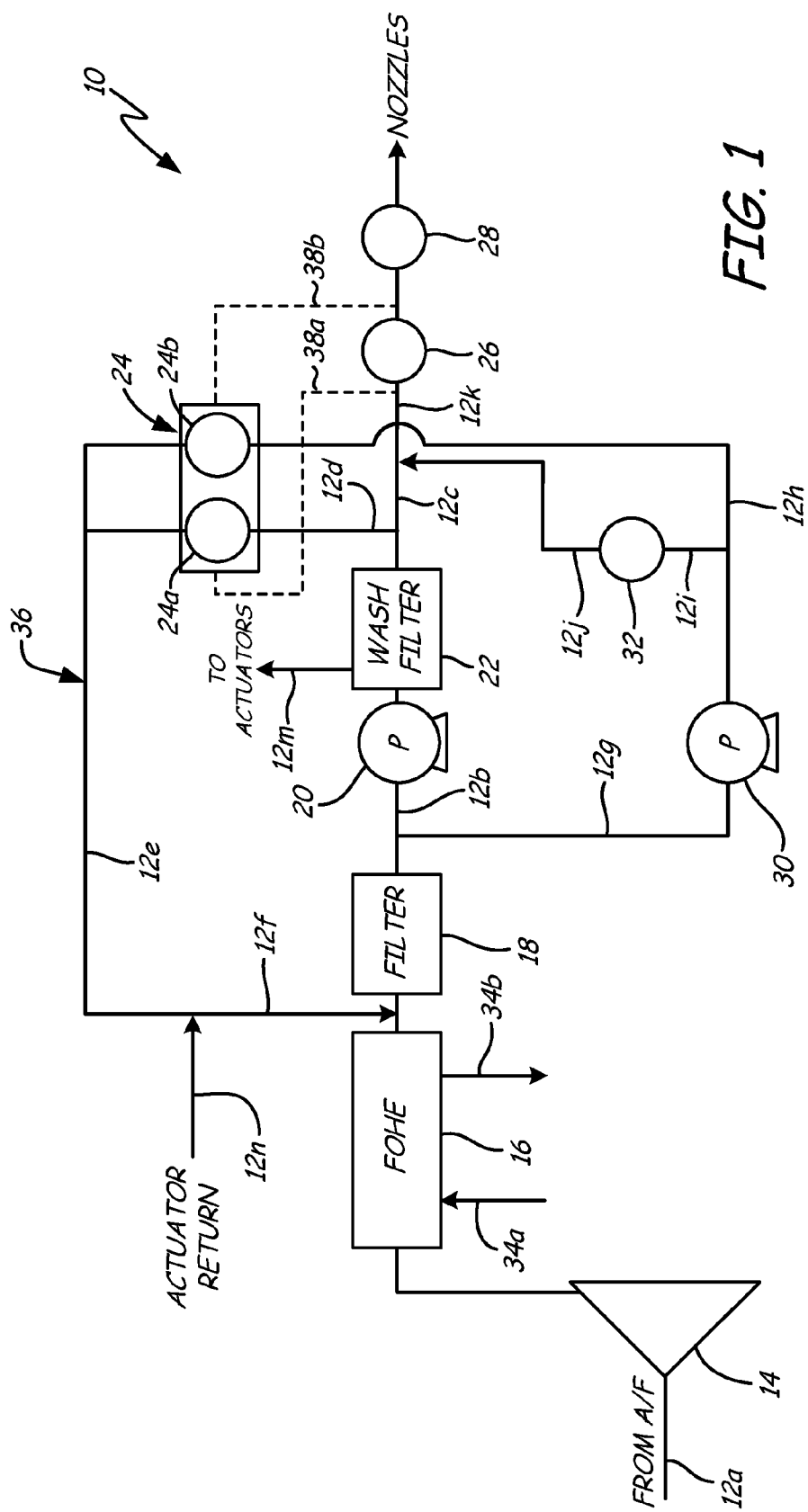
FIG. 1 is a schematic representation of a fuel flow system having a dual window valve.

FIG. 1 is a schematic representation of fuel flow system 10 for a gas turbine engine onboard an aircraft. Fuel flow system 10 receives fuel through conduit 12a from the air frame (A/F). In one example, fuel flow system 10 receives fuel from a fuel tank onboard the aircraft. Boost pump 14 increases the pressure of the fuel and supplies the fuel to fuel-oil heat exchanger (FOHE) 16 and filter 18. The fuel is then supplied to the system comprising cruise pump 20, wash filter 22, bypass pressure regulator valve (PRV) 24 (having cruise bypass window 24a and idle bypass window 24b), metering valve (MV) 26, minimum pressure and shut off valve (MPSOV) 28, idling pump 30, and check valve 32. Conduits 12a, 12b, 12c, 12d, 12e, 12f, 12g, 12h, 12i, 12j, 12k, 12m and 12n connect the components so that fuel flows from boost pump 14 to nozzles of a combustion chamber.

Boost pump 14 receives and pressurizes fuel from the air frame (A/F). Boost pump 14 can be a typical centrifugal pump designed to operate at an essentially constant pressure for a given engine speed. The fuel flows from boost pump 14 to FOHE 16.

Lubricating and cooling oil for engine components, such as the main engine bearings, circulates through an oil loop represented by inlet conduit 34a and outlet conduit 34b. Hot oil from the engine enters FOHE 16 through inlet conduit 34a. The oil rejects heat into the fuel flowing through FOHE 16. The cooled oil exits FOHE 16 through conduit 34b and is directed back to the engine components. FOHE 16 transfers heat from the oil to the fuel. The amount of heat transferred to the fuel is limited by the maximum temperature tolerable by the fuel. Decreasing heat rejection by components downstream of FOHE 16 enables more heat to be rejected into the fuel by the oil in FOHE 16.

After FOHE 16, the fuel flows through filter 18. Filter 18 protects contaminate sensitive components of fuel flow system 10. Filter 18 filters contaminates that might enter fuel flow system 10 through the fuel.

After filter 18, the fuel is divided between cruise pump 20 and idling pump 30. A portion of the fuel flows through conduit 12b to cruise pump 20. Cruise pump 20 provides fuel to actuators through wash filter 22 and conduit 12m. Cruise pump 20 can be a positive displacement pump that is sized, as a minimum, to meet the maximum burn flow requirements at cruise condition plus parasitic internal leakage losses in the fuel system.

The actuators can be high pressure fluid actuators which operate engine components, such as but not limited to, inlet guide vanes, bleed valves, turbine cooling valves and nozzle actuators. Cruise pump 20 increases the pressure of the fuel sufficiently to satisfy the load requirements of the actuators while also providing fuel to the engine burner nozzles. The minimum pressure and shutoff valve (MPSOV) 28, regulates the discharge pressure of cruise pump 20 above the inlet pressure of cruise pump 20 to assure the positive operation of the actuators against their design loads. In one example, cruise pump 20 is operated at about 1724 kilopascals difference (254 psid). High pressure fuel flow is provided to the actuators from the discharge of cruise pump 20 through conduit 12m. Low pressure fuel flow from the actuators is returned to bypass loop 36 through conduit 12n.

Fuel flow from cruise pump 20 in excess of actuator and engine burn flow needs is directed through cruise bypass window 24a of bypass pressure regulating valve (PRV) 24 and through bypass loop 36 comprised of conduit 12e and conduit 12f. The recycled or bypassed fuel is reintroduced into the fuel flowing to the inlets of cruise pump 20 and idling pump 30. In FIG. 1, the bypassed fuel is introduced at a location downstream of the outlet of FOHE 16. However, the bypassed fuel can be introduced at any location upstream of the inlets of cruise pump 20 and idling pump 30.

Cruise bypass window 24a is a variable restriction through which bypass fuel from cruise pump 20 can flow. The area of cruise bypass window 24a can be varied to adjust the flow of fuel from cruise pump 20 through cruise bypass window 24a. Cruise bypass window 24a is manufactured on PRV 24.

PRV 24 in conjunction with MV 26 schedules the flow of fuel to the engine burner nozzles. PRV 24 senses pressure upstream and downstream of MV 26 through lines 38a and 38b, respectively. PRV 24 regulates the bypass fuel flow by varying cruise bypass window area 24a as necessary to maintain a constant pressure differential between the pressure upstream and downstream of MV 26. In one example, the metering area of MV 26 is known as a function of the valve position of MV 26. Since PRV 24 maintains pressure drop across MV 26 to a constant value, the burn flow is scheduled as a function of the valve position of MV 26.

Fuel from filter 18 is also fed to idling pump 30 through conduit 12g. Similar to cruise pump 20, idling pump 30 can be a positive displacement pump. Idling pump 30 operates in parallel with cruise pump 20 and typically has a larger capacity than cruise pump 20. The combined capacity of cruise and idling pumps 20, 30 is sized to satisfy engine burn flow, actuator transient flow and parasitic leakage flow under all engine operating conditions including starting and high power conditions. In one example, the capacity of idling pump 30 is approximately two-thirds of the total capacity of cruise pump 20 and idling pump 30.

Check valve 32 and idling bypass window 24b of PRV 24 are in fluid communication with idling pump 30. Check valve 32 is designed to default to a closed position so that the fuel flow from idling pump 30 is directed through conduit 12h and idling bypass window 24b to bypass loop 36 (which is comprised of conduit 12e and conduit 12f). The bypass fuel from cruise pump 20 and idling pump 30 mix in conduit 12e. The bypass fuel then flows through conduit 12f and is directed to a location upstream of cruise pump 20 and idling pump 30 and downstream of boost pump 14.

Idling bypass window 24b is a variable restriction and operates in a similar fashion as cruise bypass window 24a. Idling bypass window 24b and cruise bypass window 24a are mechanically linked. As PRV 24 moves to maintain the pressure drop across MV 26, PRV 24 varies the areas of both cruise bypass window 24a and idling bypass window 24b. Cruise bypass window 24a and idling bypass window 24b are both manufactured on PRV 24 and vary together with a predetermined relationship as described further below. Since the capacity of cruise pump 20 is sized to satisfy engine needs at cruise conditions and no additional flow from idling pump 30 is required, idling bypass window 24b is sized to provide minimum restriction to the flow from cruise pump 30 at these conditions and the fuel flow is circulated back to the inlets of cruise pump 20 and idling pump 30.

As discussed above, cruise pump 20 and idling pump 30 can be positive displacement pumps so that a fixed amount of flow is delivered for each revolution. Cruise pump 20 and idling pump 30 are connected to an engine gearbox, and the speed of cruise pump 20 and idling pump 30 are proportional to the engine speed. Under certain conditions, such as cruise, the engine speed is high while the engine burn fuel flow requirement is relatively low. This results in larger fuel flow being delivered by cruise and idling pumps 20, 30 than is required by the engine. The extra fuel flow is recycled through bypass loop 36 defined by conduit 12e and conduit 12f. Recycling the fuel is an inefficiency in the pumping system, results in wasted horsepower, and results in additional heat rejected into the fuel. Further the higher the pressure that the pump is operated at, the larger the recirculation loss.

In fuel flow system 10, cruise pump 20 provides the pressure and flow for both the burn flow path to the nozzles and the flow path to the actuators for some engine operating conditions such as cruise. Further, cruise pump 20 is smaller than idling pump 30 such that the majority of the displacement is on idling pump 30. Cruise pump 20 is sized to satisfy the requirements of the maximum cruise condition plus the actuator slew requirements. At thermally critical conditions such as cruise, idling pump 30 is only recirculating fuel to the outlet of FOHE 16. The minimum pressure rise of idling pump 30 can be as low as the pressure drop required for recirculating the fuel. The minimum pressure rise of idling pump 30 is not limited by the burn flow path (i.e., the requirements of the flow path to the nozzles and actuator requirements). In fuel flow system 10, at thermally critical operating conditions such as cruise, cruise pump 20 is operated at a higher pressure than idling pump 30. However, the higher pressure is across a small portion of the total displacement of cruise pump 20 plus idling pump 30. The larger portion of the displacement is across idling pump 30 which is operating at a relatively low pressure. For example, cruise pump 20 can be operated at about 1724 kilopascals difference (about 254 psid) and idling pump 30 can be operated at about 517 kilopascals difference (about 75 psid). Relative to a conventional single pump system where the higher pressure rise (254 psid) would be required to be across the total pump displacement, the design of fuel flow system 10 reduces the horsepower required at cruise conditions and the amount of heat rejected by the pumps into the fuel.

Cruise pump 20 is sized to satisfy the maximum cruise condition plus actuator slew requirements, and idling pump 30 is sized so that cruise pump 20 and idling pump 30 together satisfy the high fuel flow conditions, such as take-off conditions. Idling pump 30 supplements the fuel flow when flow requirements exceed the capacity of cruise pump 20. PRV 24, cruise bypass window 24a, idling bypass window 24b, and check valve 32 function to introduce idling pump 30 output to the main flow path (conduit 12c) when fuel flow beyond the capacity of cruise pump 20 is required by the engine. More specifically, PRV 24 translates to maintain the pressure drop across MV 26 by varying cruise bypass window 24a and idle bypass window 24b, as described further below with respect to FIG. 2A.

Cruise bypass window 24a and idling bypass window 24b are variable restrictions. Closing cruise bypass window 24a increases the restriction and reduces bypass flow from cruise pump 20, thus making more fuel flow available to satisfy engine burn and actuator requirements. Idling bypass window 24b operates in a similar manner. At cruise condition when the fuel flow demand is very low, the fuel flow demand is satisfied entirely by the fuel flow from cruise pump 20. As described above, cruise pump 20 is sized to meet the requirements of the maximum cruise condition and the actuator slew requirements. Further, at the cruise condition, idling bypass window 24b has a low restriction such that the opening in idling bypass window 24b is large and approximately all of the fuel from idling pump 30 passes through idling bypass window 24b to bypass loop 36 (which is comprised of conduit 12e and conduit 12f). The low restriction of idling bypass window 24b minimizes the pressure rise across idling pump 30 at the cruise condition and reduces the amount of heat rejected into the fuel by idling pump 30.

When the demand for fuel flow increases, cruise bypass window 24a is variably restricted. For example, when the pressure drop across metering valve 26 is lower than the regulated value, PRV 24 translates to increase the restriction of cruise bypass window 24a (i.e., decreases the area available for fuel to flow through cruise bypass window 24a). Increasing the restriction of cruise bypass window 24a reduces fuel flow from cruise pump 20 through conduit 12e and conduit 12f of bypass loop 36 and increases the flow of fuel from cruise pump 20 through the main fuel flow path to the nozzles. The maximum capacity of cruise pump 20 is reached when cruise bypass window 24a is completely restricted such that all fuel from cruise pump 20 flows to the nozzles.

As PRV 24 translates to vary the restriction of cruise bypass window 24a, PRV 24 also varies the restriction of idling bypass window 24b. As discussed above, cruise bypass window 24a and idling bypass window 24b are both manufactured on PRV 24 and vary together with a predetermined relationship. When the capacity of cruise pump 20 does not meet the fuel flow requirements, additional fuel flow from idling pump 30 is provided to the engine. As cruise bypass window 24a is restricted, PRV 24 also increases the restriction of idling bypass window 24b (i.e., decreases the area available for fluid flow through idling bypass window 24b). Restricting idling bypass window 24b increases the pressure of the fuel in conduit 12h and conduit 12i. When the pressure in conduit 12h and conduit 12i is equal to or greater than the pressure in conduit 12c, check valve 32 opens and some of the fuel from idling pump 30 flows through the main fuel flow path of conduit 12k to the nozzles. Cruise bypass window 24a, idling bypass window 24b and check valve 32 enable idling pump 30 to add to the main flow path (conduit 12c and 12k) when the additional capacity of idling pump 30 is needed to satisfy fuel flow requirements. More specifically, cruise bypass window 24a, idling bypass window 24b and check valve 32 enable idling pump 30 to be brought on line when cruise bypass window 24a is fully restricted such that all fuel from cruise pump 20 is flowing either through the actuators or through metering valve 26 and cruise pump 20 is unable to satisfy the fuel flow requirements.

When PRV 24 senses a pressure drop greater than the regulated value, the variable restriction of cruise bypass window 24a and idling bypass window 24b operates in a converse manner. When PRV 24 measures a pressure drop across MV 26 greater than the regulated value, PRV 24 translates to reduce the restriction of idling bypass window 24b (i.e., increases the area available for fluid to flow through idling bypass window 24b) and cruise bypass window 24a. As idling bypass window 24b opens, the discharge pressure of idling pump 30 is reduced. When idling pump 30 discharge pressure falls below the pressure in the main flow path, check valve 32 closes, and burn and actuation flows are again supplied only by cruise pump 20.

Figure 2A:
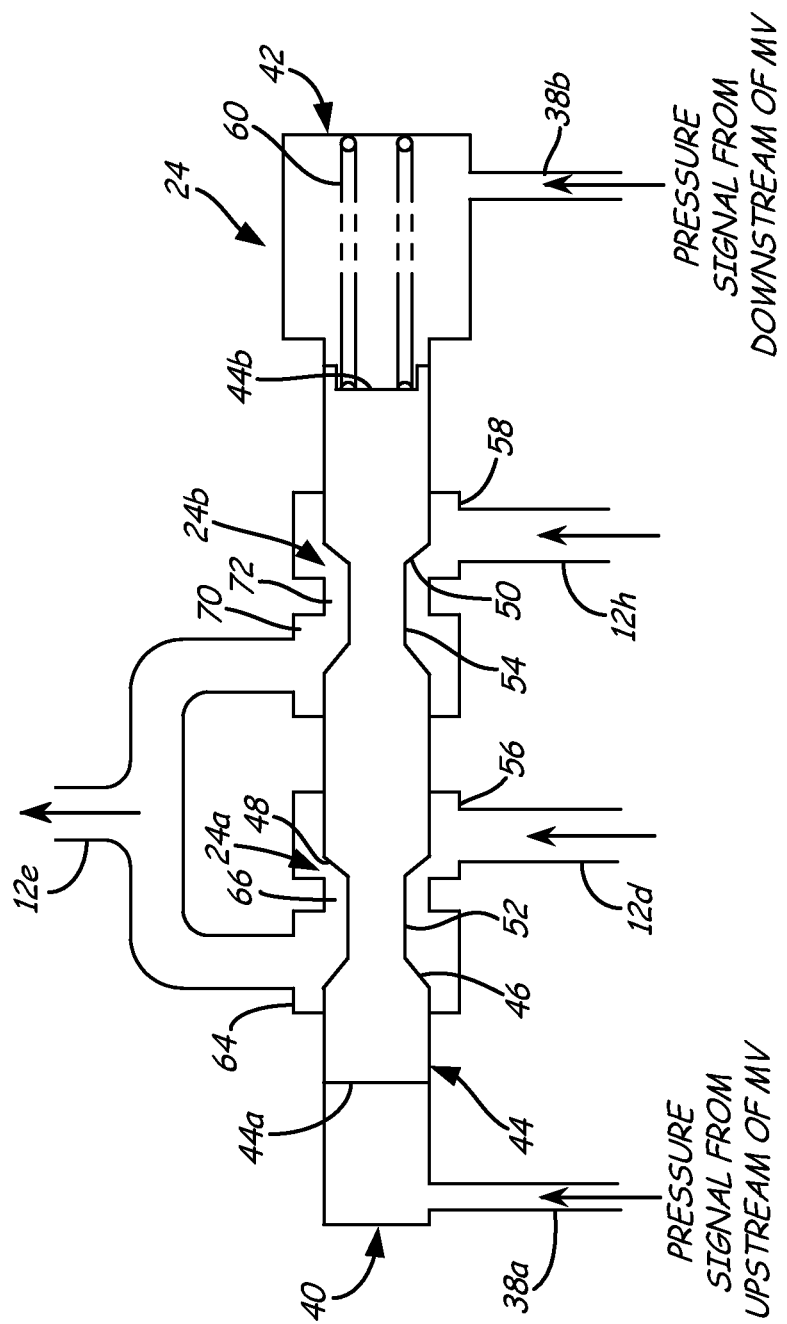
FIG. 2A is a cross-sectional schematic representation of the dual window valve of FIG. 1 during low fuel flow conditions.

FIG. 2A is a cross-sectional schematic of PRV 24 when the fuel flow demand is low, such as at cruise conditions, and all fuel flow demand is met by cruise pump 20. PRV 24 includes high pressure side 40, low pressure side 42, spool 44 having first metering edge 48, second metering edge 50, first discharge bucket 52, second discharge bucket 54, first inlet flow annulus 56, second inlet flow annulus 58, spring 60, first outlet flow annulus 64, first passage 66, second outlet flow annulus 70, and second passage 72. Spool 44 is slidably located in a housing having high pressure side 40 and low pressure side 42. High pressure from line 38a works on high pressure end 44a of spool 44. Low pressure from line 38b in conjunction with spring 60 works on low pressure end 44b of spool 44. Spring 60 sets the pressure differential to be maintained across MV 26.

PRV 24 includes first and second inlet annuli 56, 58. First inlet annulus 56 receives fuel flow from cruise pump 20 through conduit 12d. First annulus 56 directs the fuel flow to first outlet annulus 64 by first passage 66. Similarly, second annulus 58 receives fuel flow from idling pump 30 through conduit 12h. Second annulus 58 directs the fuel flow to second outlet annulus 70 by second passage 72. Fuel from first outlet annulus 64 and second outlet annulus 70 exit PRV 24 and flow through conduit 12e.

Spool 44 is a dual window valve having cruise bypass window 24a and idling bypass window 24b. Spool 44 is slidably engaged in a housing and includes first metering edge 48, first flow passage 52 and first exit bucket 46. Cruise bypass window 24a is defined between first metering edge 48 and first inlet annulus 56. As described above, fuel flow from cruise pump 20 flows into first inlet cavity 62 and through first passage 66 to first outlet cavity 64. The position of spool 44 determines the size of cruise bypass window 24a. More specifically, the maximum diameter of first metering edge 48 is greater than the diameter of first passage 66. As spool 44 translates to the left, first metering edge 48 moves towards inlet annulus 56 and the area of cruise bypass window 24a becomes smaller because there is less area for fuel to flow between the first metering edge 48 and first annulus 56. Cruise bypass window 24a is closed when first metering edge 48 aligns with the edge of flow annulus 56 and fuel cannot flow through first passage 66.

Idling bypass window 24b operates in a similar manner. Fuel flow from idling pump 30 flows into second inlet cavity 58 and through second metering window 24b and second passage 72 to second outlet annulus 70. The position of spool 44 determines the size of idling bypass window 24b. More specifically, the maximum diameter of second metering edge 50 is greater than the diameter of second passage 72. As spool 44 translates to the left, second metering edge 50 moves towards second inlet annulus 58 and the area of idling bypass window 24b becomes smaller because there is less area for fuel to flow between the second metering edge 50 and second annulus 58. Idling bypass window 24b is closed when second metering edge 50 aligns with the edge of flow annulus 58 and fuel cannot flow through second passage 72.

Spool 44 translates or slides to simultaneously adjust the size or restriction of cruise bypass window 24a and idling bypass window 24b and maintain a constant pressure drop across MV 26. FIG. 2A illustrates PRV 24 when the fuel flow demand is low, such as at cruise conditions. In this position, the hydraulic force exerted on high pressure end 44a is equal to the sum of the hydraulic force exerted on low pressure end 44b plus the force exerted by spring 60. When the forces are equal, the pressure drop across MV 26 is at its desired constant value. During a cruise condition, force equilibrium on spool 44 will occur with cruise bypass window 24a open sufficiently to bypass flow from the cruise pump 20 that is in excess of engine demand back to cruise pump inlet via conduit 12e. In addition, the idle bypass window 24b is open to a maximum value and directs all flow from the idling pump 30 from conduit 12h flows through idling bypass window 24b to conduit 12e of bypass loop 36. With idle bypass window 24b open to a maximum value, restriction in the idle pump bypass path is minimized, which minimizes the pressure rise across the idling pump and therefore minimizes idling pump power.

Figure 2B:
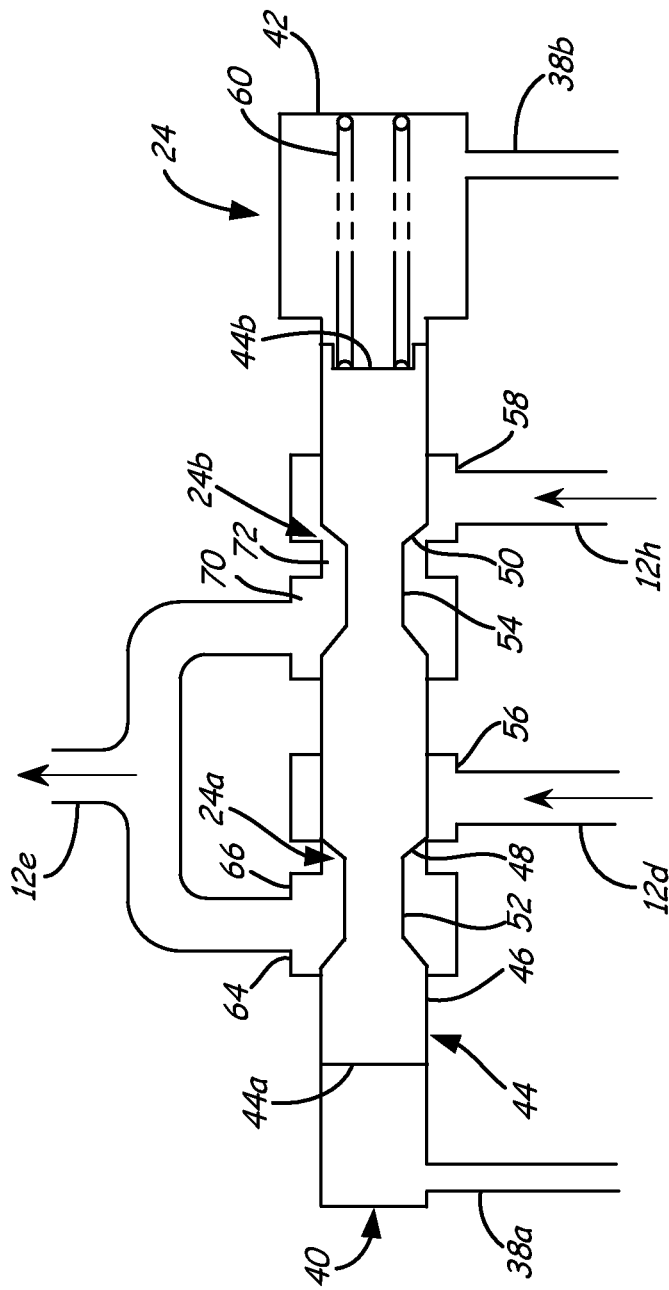
FIG. 2B is a cross-sectional schematic representation of the dual window valve of FIG. 1 during high fuel flow conditions.

When engine fuel demand increases, MV 26 is commanded to a more open position, and the pressure differential between line 38*a* and 38*b* will temporarily decrease (i.e., the pressure drop across MV 26 decreases) and spool 44 translates to the left. FIG. 2B illustrates PRV 24 during high fuel flow demand conditions, such as take-off. At high fuel flow demand, spool 44 translates to the left, as illustrated, until first metering edge 48 aligns with first annulus 56. In this position, fuel from conduit 12*d* (i.e., from cruise pump 20) cannot flow through cruise bypass window 24*a* and all fuel flow from cruise pump 20 is directed to the nozzles. Additionally, in this position, idling bypass window 24*b* has a smaller cross-sectional area so that fuel flow through idling bypass window 24*b* is also restricted. This increase in restriction results in increased pressure rise across idling pump 30. When the idling pump pressure rise is approximately equal to the cruise pump pressure rise, the check valve 32 opens and some idling pump flow is joins with the cruise pump flow. The fuel flow from idling pump 30 to the MV 26 is increased until MV pressure drop is again established and force balance on PRV spool 40 is restored.

As shown in FIGS. 2A and 2B, cruise bypass window 24*a* and idling bypass window 24*b* are mechanically linked by spool 44. Translation of spool 44 affects the areas or restrictions of both cruise bypass window 24*a* and idling bypass window 24*b*, and because of spool 44, cruise bypass window 24*a* and idling bypass window 24*b* vary with a known relationship. PRV 24 and spool 44 are designed such that cruise bypass window 24*a* is always restricted or closed to a greater extent than idling bypass window 24*b*. Because of this design, fuel flow from cruise pump 20 is first used to satisfy the fuel demands of the engine, and fuel flow from idling pump 30 is brought on-line to supplement that of cruise pump 20 during high fuel flow conditions.

As described above, cruise pump 20 is sized to meet the requirements for maximum cruise condition and the actuator steady-state leakage requirements. In fuel flow system 10, cruise pump 20 provides the pressure and flow for both burn and actuation at the cruise condition, while idling pump 30 recirculates at a minimum pressure drop. Thus, in fuel flow system 10, the higher pressure is across a small portion of the displacement (i.e., cruise pump 20) and the majority of the displacement (i.e., by idling pump 30) is at a relatively low pressure. Fuel flow system 10 results in reduced horsepower of the combination of cruise pump 20 and idling pump 30 at cruise conditions relative to a fuel system utilizing a single fuel pump sized for total capacity where the higher pressure would be required to be across the entire displacement. This results in less heat rejection by cruise pump 20 and idling pump 30 into the fuel and enables greater heat rejection by the oil of FOHE 16 while maintaining the fuel within the temperature range tolerable by the fuel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel flow system for a gas turbine engine, the system comprising:
   a first pump in communication with a fuel source and a nozzle;
   a second pump in communication with the fuel source and the nozzle;
   an actuator in communication with the first pump;
   a metering valve disposed downstream of the first and second pumps;
   a bypass loop connected to the first pump and the second pump and configured to recycle excess fuel from the first pump and excess fuel from the second pump back to inlets of the first and second pumps;
   a dual window valve comprising:
      a housing having a high pressure side, a low pressure side, a first inlet connected to the first pump, a first outlet connected to the bypass loop, a first flow passage connected between the first inlet and the first outlet, a second inlet connected to the second pump, a second outlet connected to the bypass loop, and a second flow passage connected between the second inlet and the second outlet;
      a spool slidably received within the housing and having a high pressure end proximate the high pressure side of the housing, a low pressure end proximate the low pressure side of the housing, a first metering edge, and a second metering edge;
      wherein the first inlet of the housing and the first metering edge of the spool define a first window;
      wherein the second inlet of the housing and the second metering edge of the spool define a second window; and
      a spring disposed between the low pressure side of the housing and the low pressure end of the spool;
      a first port formed in the high pressure side of the housing and configured to receive a pressure signal from upstream of the metering valve; and
      a second port formed in the low pressure side of the housing and configured to receive a pressure signal from downstream of the metering valve; and
   wherein the metering valve is in communication with the first pump, and wherein the metering valve is in communication with the second pump when the second window is restricted.

2. The fuel flow system of claim 1, the system further comprising:
   a main fuel flow path formed between the first pump and the metering valve,
   wherein the second pump is connected to the main fuel flow path in parallel with the first pump, and wherein the second pump is configured to supplement fuel flow from the first pump under certain conditions; and
   a heat exchanger disposed upstream from the first pump and the second pump,
   wherein the bypass loop is configured to recycle excess fuel from the first pump and excess fuel from the second pump back to inlets of the first and second pumps and downstream from the heat exchanger.

3. The fuel flow system of claim 1, wherein the first pump has a smaller volume than the second pump.

4. The fuel flow system of claim 1, wherein the first pump operates at a higher pressure than the second pump.

5. The fuel flow system of claim 1, wherein the first pump is configured to satisfy maximum cruise conditions plus actuator slew requirements.

6. The fuel flow system of claim 1, wherein the first pump and the second pump are sized to together satisfy maximum fuel flow conditions.

7. The fuel flow system of claim 1, and further comprising:
a check valve connected between the second pump and the metering valve, wherein the check valve opens when pressure from the second pump is equal to or greater than pressure from the first pump.

8. The fuel flow system of claim 1, wherein the position of the spool is adjusted to maintain a substantially constant pressure drop across the metering valve.

9. The fuel flow system of claim 1, wherein the first window allows fuel from the first pump to enter the bypass loop and wherein the second window allows fuel from the second pump to enter the bypass loop.

* * * * *